C. J. VANN.
FOOD DISPENSING APPARATUS.
APPLICATION FILED JAN. 13, 1916.

1,416,764.

Patented May 23, 1922.
3 SHEETS—SHEET 3.

Witnesses:
Louise Enderle
David H. Douglass

Charles J. Vann, Inventor
By his Attorney
Thousand Hill

UNITED STATES PATENT OFFICE.

CHARLES J. VANN, OF BROOKLYN, NEW YORK.

FOOD-DISPENSING APPARATUS.

1,416,764.            Specification of Letters Patent.      Patented May 23, 1922.

Application filed January 13, 1916. Serial No. 71,926.

*To all whom it may concern:*

Be it known that I, CHARLES J. VANN, a citizen of the United States, residing at the borough of Brooklyn, in the county of Kings and State of New York, have invented certain new and useful Improvements in Food-Dispensing Apparatus, of which the following is a specification, reference being had therein to the accompanying drawing.

My invention relates to improvements in food serving and dispensing apparatus, and more particularly has reference to a device especially adapted for feeding chips or cubes of butter on plates.

Figure 1:
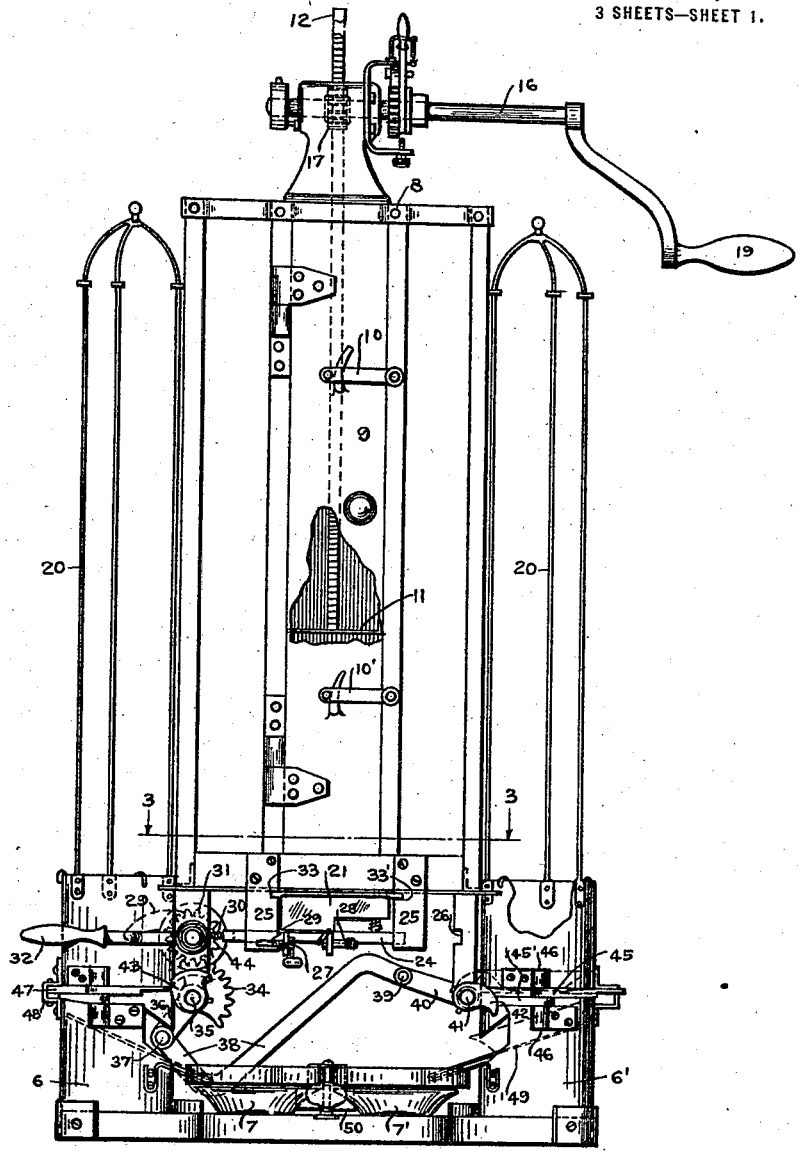
Figure 3:
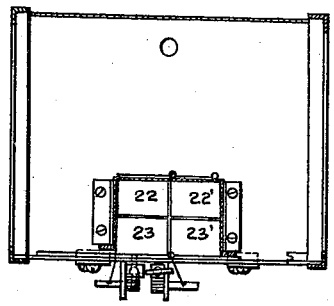
Figure 2:
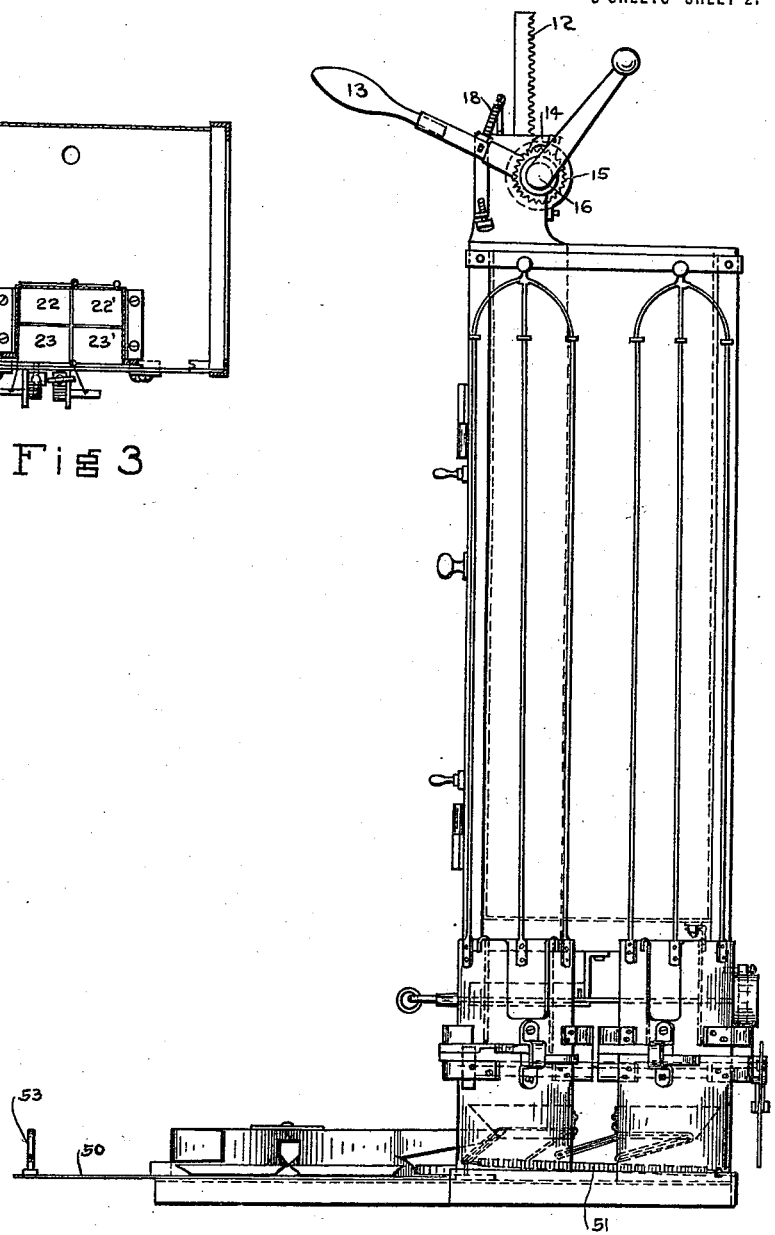
Figure 4:
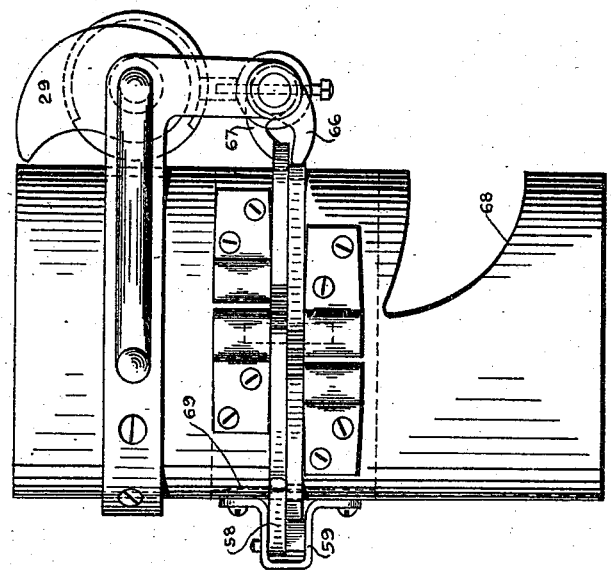

Referring to the accompanying drawings, Figure 1 illustrates in front elevation, partly broken away, an apparatus embodying an application of my invention. Figure 2 is a side elevation of the same. Figure 3 a cross section on the line 3—3 of Figure 1. Figure 4 an enlarged side elevation of a modified form of plate distributing mechanism, and Figure 5 a view looking from right to left at Figure 4.

6—6' indicate the tubular magazines within which the butter plates such as 7—7' are stacked and upon which the superstructure of the machine is built. 8 indicates the butter chamber or magazine into which the butter is fed and which is accessible by the door 9 which may be secured by any suitable means such as the levers 10—10'. 11 indicates a suitable plunger at the end of the rack 12 for pressing the butter down into position. For this purpose a lever such as 13 may be provided with a pawl such as 14 which is adapted to engage the teeth of the sprocket wheel 15 upon the shaft 16 which carries a pinion 17 engaging the teeth of said rack 12, said lever being provided with a suitable spring such as 18 to return it to the position shown in Figure 2. From this it will be seen that the lever 13 is pressed downwardly, the pinion 17 is rotated thereby and causes the plunger 11 at the end of the rack 12 to feed the butter downwardly through the chute 8. For returning the plunger to its uppermost position to receive a new charge of butter, the crank 19 may be mounted upon the end of the shaft 16 which carries the pinion 17 thus making it convenient to reverse said pinion rapidly for re-charging the butter chamber. 20 are suitable guides or framing above the plate holders 6—6' within which a large stack of butter plates may be stored in position for feeding into the machine.

As the butter is pressed downwardly by the plunger 11, it feeds through the die 21 which divides the column of butter in sections. That is to say, looking at Figure 3 into the four sections indicated by the reference characters 22—22' and 23—23'. Beneath the die 21 is mounted a suitable reciprocating carriage such as 24 adapted to slide transversely in the brackets 25, the inner end of the same being adapted to engage the recess 26 when at its rightward extremity. This carriage is provided with suitable wires such as 27—28 which as the carriage 24 travels rightwardly cuts across the four vertical sections of butter; thus providing four chips or blocks therefrom which drop into the plates 7—7' in position beneath the same.

In order to reciprocate the carriage 24 the same is held against the face of the cam 29 by any suitable means such as the spring 30 so that as the shaft 31 is rotated by suitable means such as the lever 32, the said cam 29 forces the carriage 24 rightwardly looking at Figure 1 against the action of said spring 30, thereby allowing the wires such as 27 and 28 to cut across the lower end of the columns of butter producing the chips or blocks thereof as aforesaid.

The die or knives across which the vertical column of butter is fed downwardly are preferably slid into position as indicated at 33—33' so that different forms of dies or cutters may be provided; thus making it possible to divide the column of butter into any number of sections or shapes therefrom.

The segmental pinion 34 upon the shaft 35 is provided with a lever 36 secured to the shaft 37 which is also provided with the lever 38 pivoted at 39 to the lever 40 upon the shaft 41 carrying the cam 42. Upon the shaft 35 is also mounted the cam 43 so that as the shaft 31 carrying the pinion 44 is rotated by the lever 32, the segmental rack 34 upon the shaft 35 is also rotated, and simultaneously therewith the cam 43, while at the same time the cam 42 upon the shaft 41 is mounted by the lever 40, pivoted at 39 to the lever 38 upon the shaft 37, keyed to the shaft 35. These cams such as 42 and 43 serve to operate the butter plate feeding devices which comprise fingers such as 45—45' hinged at 46 and provided with an overlying rocker member 47 pivoted within the U-shaped bracket 48 so that any movement of the finger 45 is imparted to the finger 45'. Either the finger 45 or 45' is always slightly projected through the wall into the interior of the plate cylinder, thereby engaging the bottom plate and preventing the column of plates from feeding therethrough. As the finger 45 is withdrawn from beneath the bottom plate the finger 45' moves inwardly beneath the next plate above; thus allowing the bottom plate to drop upon the slide 49 from which it slides into the position indicated at 7', and of course the same thing applies to the other plate holders. The number of plate holders in the apparatus being immaterial and vary according to the requirements for which the machine is intended.

50 is a suitable slide or tray normally retained beneath the machine by any suitable means such as the spring 51, the same being shown extended in Figure 2. This slide when pulled leftwardly looking at Figure 2 by any suitable means such as the finger piece 53, engages and withdraws from beneath the machine the plates containing the butter and is free to return beneath the next set of filled butter plates which slide in position to be withdrawn by the tray, and so on.

Figure 5:
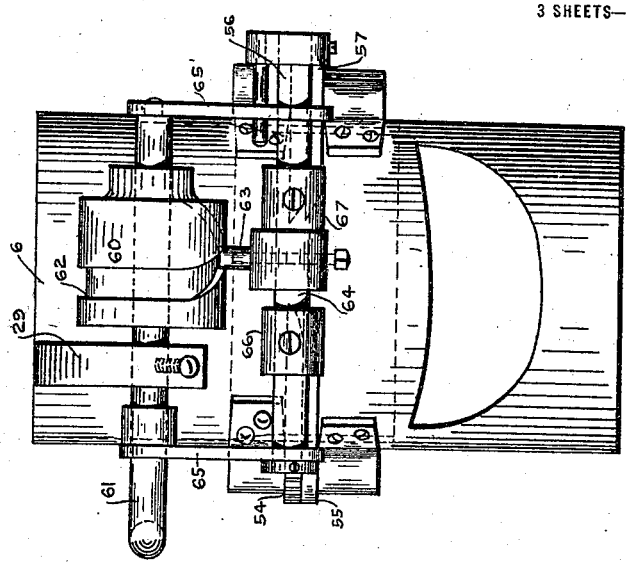

In the modification shown in Figures 4 and 5, two pairs of jaws 54—55 and 56—57 may be employed at each side of the plate feeding cylinder 6 and a suitable rider such as 58 may be pivotally mounted within the bracket 59 to engage alternate upper and lower of said jaws at the back. At the front a suitable cam such as 60 may be mounted upon the crank shaft 61 providing a guideway 62 within which the pin 63 mounted upon a shaft 64 may feed, thereby causing said shaft 64 to reciprocate transversely within the brackets 65—65'. Said shaft 64 is also preferably provided with suitable engaging members 66—67 which as they pass transversely across the plate cylinder 6, first thrust one set of fingers and then the other set of fingers within said plate cylinder 6, thereby alternately and successively engaging the lowermost plate of the stack and releasing the same, said plate discharging through the opening 68 within said tube upon a suitable guide such as 49 which delivers it in position to receive the butter. 69 indicates a suitable guide running within the cylinder immediately adjacent said fingers which serves to keep the plates uniform and in proper position for engagement with said fingers.

Of course it will be understood that various modifications may be made without departing from the spirit of the invention as claimed.

I claim:

1. In an automatic butter feeding machine, means for feeding several columns of butter simultaneously, means for cutting off a chip from each of said columns simultaneously, means for feeding plates beneath said chips as cut for receiving a chip upon each plate, and means for discharging said plates with said chips thereupon.

2. In an automatic butter feeding machine, means for feeding several columns of butter mechanically without changing the outer contour of said columns and in combination therewith means for cutting chips therefrom.

In testimony whereof I hereunto affix my signature in the presence of two witnesses.

CHARLES J. VANN.

Witnesses:
 LOUISE ENDERLE,
 THOMAS A. HILL.